United States Patent [19]

Hakluytt

[11] Patent Number: 4,904,917
[45] Date of Patent: Feb. 27, 1990

[54] DRIVE APPARATUS

[75] Inventor: Piers D. Hakluytt, Laindon, England

[73] Assignee: Rank Pullin Controls Limited, United Kingdom

[21] Appl. No.: 90,181

[22] Filed: Aug. 27, 1987

[30] Foreign Application Priority Data

Aug. 29, 1986 [GB] United Kingdom ............... 86209383

[51] Int. Cl.$^4$ .............................................. H02P 8/00
[52] U.S. Cl. ..................................... 318/696; 318/685; 318/257
[58] Field of Search ............... 318/696, 685, 257, 341; 355/8, 14 R

[56] References Cited

U.S. PATENT DOCUMENTS

| 3,260,912 | 7/1966 | Gregory | 318/257 |
| 3,354,371 | 11/1967 | Ainoworth et al. | 318/341 |
| 3,757,191 | 9/1973 | Agaki et al. | 318/685 |
| 3,805,138 | 4/1974 | Hilker | 318/696 |
| 4,031,447 | 6/1977 | Togo et al. | 318/685 |
| 4,039,919 | 8/1977 | Suzaki et al. | 318/696 |
| 4,107,595 | 8/1978 | Campe | |
| 4,142,140 | 2/1979 | Wierner | 318/696 |
| 4,147,189 | 11/1983 | Overfield | |
| 4,238,717 | 12/1980 | Knight et al. | 318/341 |
| 4,490,661 | 12/1984 | Brown et al. | |
| 4,600,868 | 7/1986 | Bryant | 318/567 |
| 4,642,543 | 2/1987 | MacMinn | 318/696 |

FOREIGN PATENT DOCUMENTS

| 077094 | 4/1983 | European Pat. Off. |
| 2925583 | 1/1980 | Fed. Rep. of Germany |
| 3441451A1 | 5/1986 | Fed. Rep. of Germany |
| WO83/00962 | 3/1983 | PCT Int'l Appl. |
| 927798 | 6/1963 | United Kingdom |
| 1229976 | 4/1971 | United Kingdom |
| 1283728 | 8/1972 | United Kingdom |
| 1385452 | 2/1975 | United Kingdom |
| 2005869A | 4/1979 | United Kingdom |
| 2031617A | 4/1980 | United Kingdom |
| 2045555A | 10/1980 | United Kingdom |
| 1579121 | 11/1980 | United Kingdom |
| 2062905A | 5/1981 | United Kingdom |
| 2111338A | 6/1983 | United Kingdom |
| 2145297A | 3/1985 | United Kingdom |
| 2166309A | 4/1986 | United Kingdom |

Primary Examiner—William M. Shoop, Jr.
Assistant Examiner—Saul M. Bergmann
Attorney, Agent, or Firm—Saidman, Sterne, Kessler & Goldstein

[57] ABSTRACT

Drive apparatus, particularly for a twin polygon thermal scanner, utilizes a stepper motor driven by pulses of variable width timed, relative to the rotational position of the motor, so that the pulses are substantially centred on the maximum torque position of the motor. This minimizes power consumption. The control circuitry for the motor performs a start sequence, which is aborted and reinitiated in the event that the motor fails properly to start and in which the frequency of the pulses applied to the stopper motor is increased as the motor accelerates. Any excessive increase in the rate of increase of frequency of the pulses is detected and corrected. When the motor is running up to speed, the power applied to the motor is controlled by a phase detector which detects variations in phase between a referenced pulse train and a pulse train generated by the rotation of the motor.

19 Claims, 7 Drawing Sheets

DRIVE APPARATUS

This invention relates to drive apparatus and has a number of aspects.

In one aspect, the invention is concerned with improving the efficiency of drive apparatus utilising a stepper motor.

In order to improve efficiency, the invention provides, according to one aspect, a power supply circuit for a stepper motor in which pulses of variable power are applied to said stepper motor for effecting rotation thereof, each of said pulses being applied such that the centres thereof substantially coincide with the maximum torque position of the motor. Preferably, the width of the pulses is variable, to vary the power in the pulses.

In an alternative aspect, the invention is concerned with improving the reliability of starting of a stepper motor for use as a drive apparatus. The invention provides, according to another aspect, means for applying pulses of increasing frequency during start up of a stepper motor, and limiting means operable to limit the rate of increase of frequency of said pulses such that said rate does not exceed a rate consistent with the acceleration achieved by the motor. Preferably a voltage controlled oscillator is provided and the limiting means is operative to control said oscillator.

In a further aspect, the invention aims to provide an improved phase detector which is useful in drive apparatus or in other applications and which can detect phase errors which exceed one cycle and preferably which may exceed a number of cycles. In one form, the phase detector according to this aspect of the invention includes means, preferably digital means, for counting cycles in the signals whose phases are to be detected and means for providing a phase indicating signal which is a function of the difference between the numbers of cycles counted by said counting means.

In an alternative aspect, the invention provides a phase detector comprising means for receiving first and second pulse trains whose relative phase is to be detected, means for producing a signal having a first value during first periods when pulses from only one of said trains are present and a second value during second periods which are between said first periods, and means for providing a phase indicating signal which is a function of the relative lengths of said first and second periods.

The invention is described by way of example with reference to the accompanying drawings in which.

Figure 1:
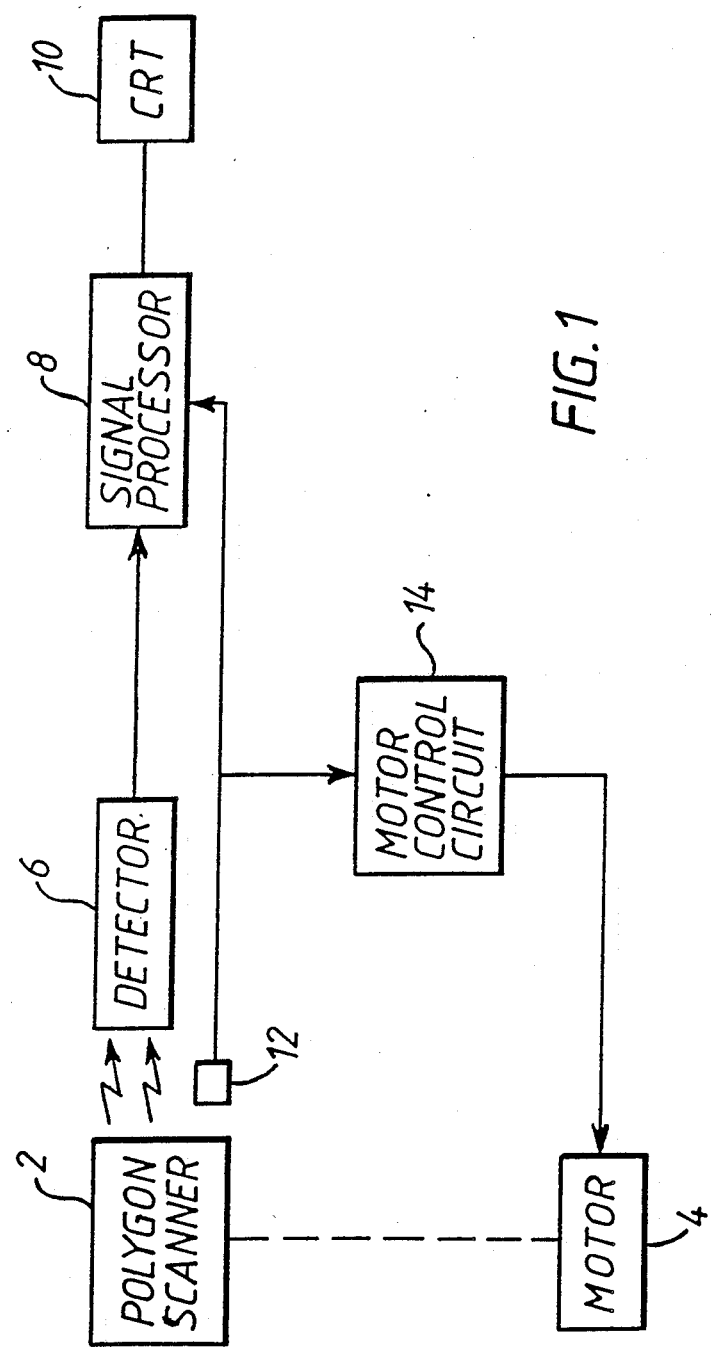
FIG. 1 is a block diagram illustrating the layout of a preferred embodiment of the invention.

With reference to FIG. 1, a thermal imager comprises a twin polygon scanner 2 which is driven by a motor 4 so that a thermal image from a field of view is scanned across a detector array 6 which may, for example, comprise eight thermal detectors. The outputs from the thermal detectors 6 are applied to a signal processing circuit 8 which performs a number of functions, such as analogue-to-digital conversion, storing, and digital-to-analogue conversion for supply to a cathode ray tube 10 on the screen of which a visible image may be produced. An electromagnetic pickup arrangement 12 supplies pulses related to the rotation of the scanner 2 to the signal processing circuit 8, for controlling the timing of various operations therein, and to a circuit 14 which controls the motor 4.

Figure 2:
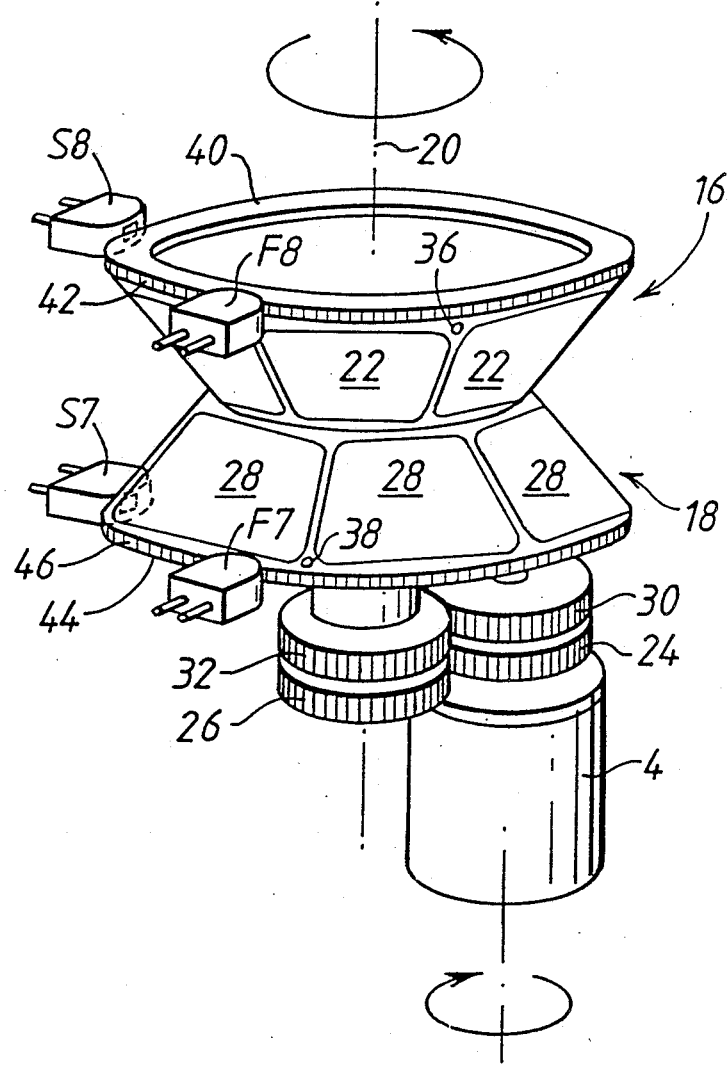
FIG. 2 is a perspective view of a twin polygon scanner incorporated in the apparatus of FIG. 1.

As seen in FIG. 2, the twin polygon scanner 2 comprises first and second polygonal mirrors 16 and 18 mounted for rotation about a common axis 20. The polygon 16 has eight reflective facets 22 and is driven by motor 4 through gears 24 and 26. The polygon 18 has seven reflective facets 28 and is driven by motor 4 through gears 30 and 32. The gears 24, 26, 30 and 32 are resilient. The polygons 16 and 18 are driven in the same direction but at different speeds. The ratio of the speed of the polygon 16 to that of the polygon 18 is 7:8. For example, the polygon 16 may be driven at a 175 revolutions per second and the polygon 18 at 200 revolutions per second. As is well known, the facets 22 of the polygon 16 are at different angles to the axis of rotation 20 from each other and similarly the facets 28 of the polygon 18 make different angles with the axis 20. The angles are such that the complete field of view is scanned once for every 56 revolutions of the polygon 16 thus producing a complete frame made up of interlaced fields, the horizontal scan being produced by the rotation of the polygons and the vertical scan being produced by the different angles which the facets 22 and 28 make with the axis 20.

The electromagnetic pickup arrangement 12 comprises four electromagnetic pickups F7, F8, S7 and S8. The pickup F8 is arranged to produce an output pulse in response to the movement therepast of a small insert 36 of magnetic material carried by the polygon 16. Similarly, the pickup F7 is arranged to produce a pulse in response to the movement therepast of a small insert 38 of magnetic material carried by the polygon 18. The arrangement is such that the inserts 36 and 38 simultaneously pass the pickups F8 and F7 only once in every seven revolutions of the eight-sided polygon 16. Thus, the coincidence of pulses from the pickups F7 and F8 provides a signal indicating the end of each frame.

The polygon 16 is provided with a ring 40 having around its periphery a series of equi-spaced metallic teeth 42 whose movement is detected by the pickup S8. For example, there may be one hundred and twenty-eight teeth 42 provided on the ring 40 so that, when the polygon 16 is rotating at 175 revolutions per second, the pick-up S8 produces a signal at a frequency of 22.4 KHz. A similar metallic ring 44 having a series of equi-spaced external metallic teeth 46 is provided on the polygon 18 and the pickup S7 detects the movement of these teeth. However, the number of teeth 46 differs from the number of teeth 42 so that the pickup S7 produces a signal at the same frequency as the pickup S8. Thus, in the numerical example under discussion, there will be one hundred and twelve teeth 46 so that the frequency of the signal from the pickup S7 is 22.4 KHz when the polygon 18 is rotating at 200 revolutions per second.

Figure 3:
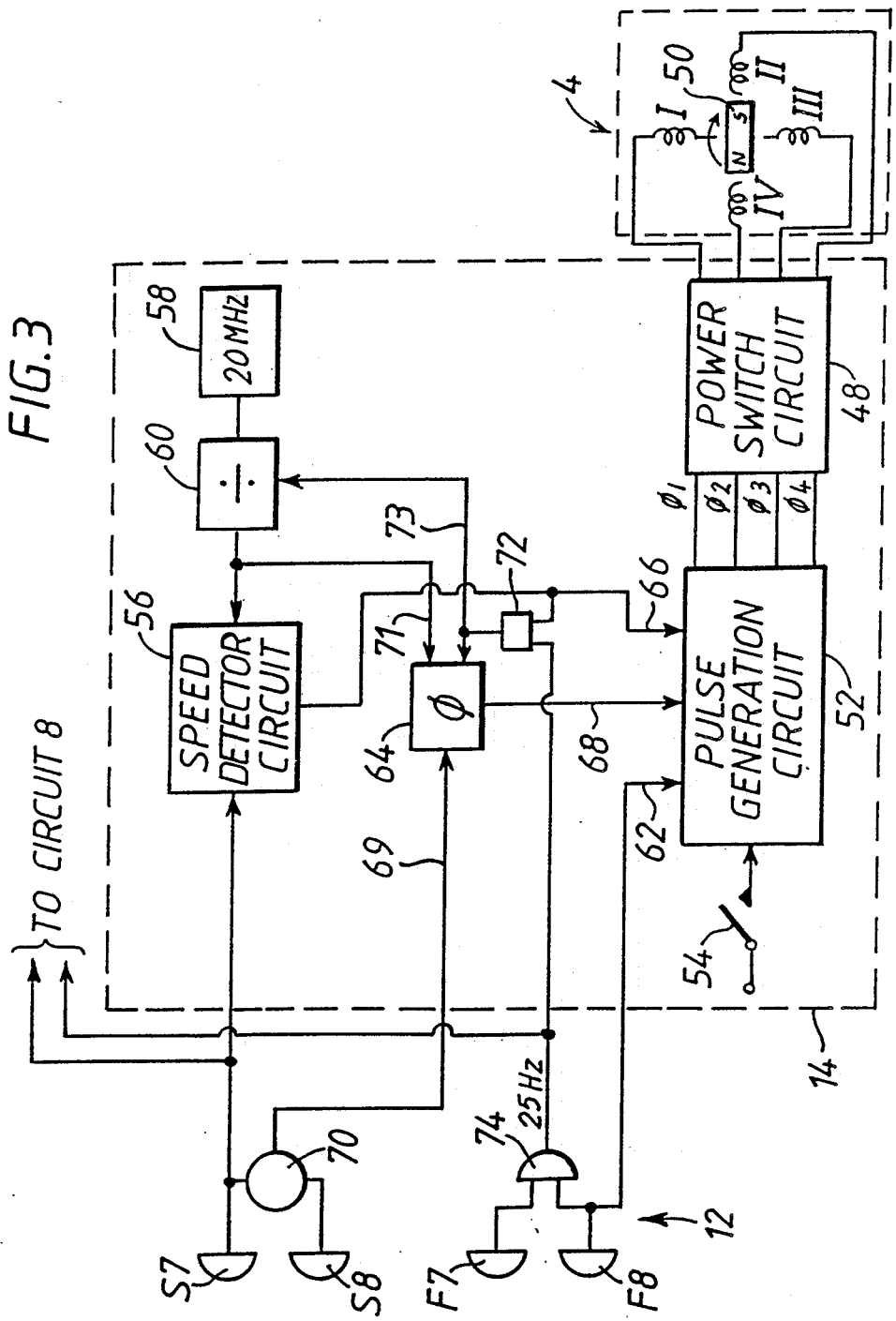
FIG. 3 is a block diagram showing part of the apparatus of FIG. 1 is more detail.

With reference to FIG. 3, the motor 4 is a stepper motor having four coils I to IV, to which power is supplied via a power switching circuit 48 of the control circuit 14, and an armature 50 represented in FIG. 3 as a rotatable bar magnet. A pulse generating circuit 52 controls the power switching circuit 48 by supplying pulses on lines $\phi1$–$\phi4$. Pulses are produced on $\phi1$–$\phi4$ in sequence. When a pulse is present on line $\phi1$, coils I and III are energized in the positive and negative directions respectively. When a pulse is present on line $\phi2$, coils II and IV are energized in positive and negative directions respectively. When a pulse appears on line $\phi3$, coils III and I are energized in positive and negative directions respectively. When a pulse is present on line $\phi4$, coils IV and II are energized in positive and negative directions respectively. Once the motor 4 has been accelerated to full speed, the power supplied to the motor 4 is varied, and accordingly fine control of the speed thereof is provided, by varying the widths of the pulses on lines $\phi1$–$\phi4$. During the initial acceleration of the motor 4, the pulses on lines 1–4 are at maximum width, and the speed of the motor 4 increases as the pulse rate increases, as will now be described.

In order to start the motor, a manually operated start switch 54 is closed and this causes the pulse generating circuit to output a pulse on line $\phi4$ which brings the armature 50 to the position shown in FIG. 3. After a short delay, the circuit 52 causes pulses to appear on lines $\phi1$–$\phi4$ in sequence at a low frequency so that the motor 4 can be gradually accelerated from rest. The speed of rotation of the motor is detected by a speed detector circuit 56 which compares the frequency of the signal from pickup S7 with a 22.4 KHz reference signal generated by a 20 MHz oscillator 58 and a division circuit 60. So long as the frequency of the signal from pickup S7 is less than 22.4 KHz, the pulses supplied to lines $\phi1$–$\phi4$ are of maximum width in order to apply maximum power to the motor 4 during acceleration. After a few revolutions of the motor, the polygons 16 and 18 should be rotating fast enough for output signals to be produced by the electromagnetic pickup F7 and F8. Accordingly, the pulse generating circuitry 52 receives on input 62 the signal from pickup F8. If this fails to appear within a certain time, this indicates that the motor has failed to start and in that event, the pulse generating circuit repeats the start sequence. When the speed detector circuit 56 detects that the frequency of the signal from the pickup S7 reaches 22.4 KHz, it outputs a signal to a phase comparator 64 and to an input 66 of the pulse generating circuit 52. The effect of the signal on input 66 is to change he condition of the circuit 52 from that in which the width of the pulses on lines $\phi1$–$\phi4$ is maximum to one in which the width of the pulses is modulated in response to a signal output by phase comparator 64 on line 68.

The phase comparator 64 is operative to compare the phase of the 22.4 KHz reference signal output by divider 60 with the average phase of the signals output by pickups S7 and S8, which signals are accordingly applied to an averaging circuit 70 whose output is applied to the phase comparator 64. If the phase of the signal output by averaging circuit 70 leads that of the reference signal output by divider 60, the width of the pulses on lines $\phi1$–$\phi4$ is decreased so as to reduce the power to the motor and, conversely, if the phase relationship is the reverse, then the width of the pulses on lines $\phi1$–$\phi4$ is increased. In this way, the speed of the motor 4 is controlled to maintain the rotational speed of the polygons 16 and 18 substantially constant with a high degree of accuracy at the required operating speed.

As will be more fully described with reference to FIG. 6, the phase comparator 64 operates digitally by counting and comparing the number of pulses received from the averaging circuit 70 with the number of pulses in the 22.4 KHz reference signal received from the dividing circuit 60. A resetting circuit 72, which is enabled by the output from the speed detection circuit 56 is operable to reset the phase detector 64 and the divider 60 in response to each frame pulse derived from an AND gate 74 whose inputs are connected to the pickups F7 and F8.

Figure 4:
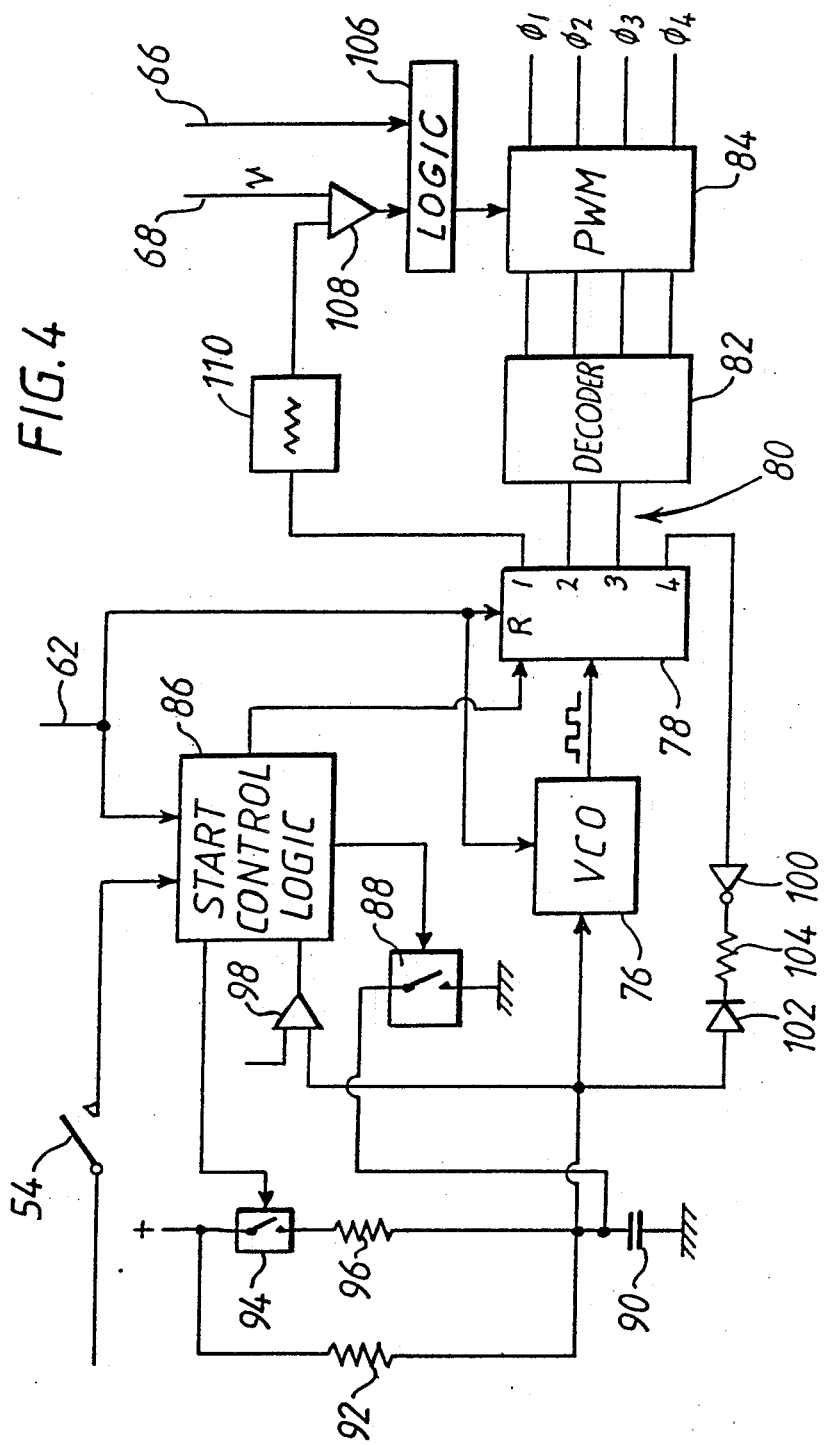
FIG. 4 is block diagram showing in more detail a pulse generating circuit included in FIG. 3.

As shown in FIG. 4, the pulse generation circuit 52 comprises a voltage controlled oscillator 76 whose output is applied to a 4 bit counter 78. Lines 80 supply signals in the second and third stages of the counter 78 to a decoder 82 which, in response to the four possible states of those two stages produces pulses successively on lines $\phi1$–$\phi4$. A pulse width modulation circuit 84 is provided in lines $\phi1$–$\phi4$ for modulating the width of these pulses. Upon closing of the start switch 54, a start control logic circuit 86 sets the counter 78 into a condition in which line $\phi4$ is energized to bring the motor armature 50 to its home position as illustrated in FIG. 3. Also, the logic circuit 86 closes a switch 88 to discharge a capacitor 90 the voltage across which is applied to the voltage controlled oscillator 76 to control its frequency. After a short delay, as previously referred to, the switch 88 is opened allowing the capacitor 90 to be charged slowly through a relatively high resistance 92. At this time a switch 94 through which current may also be supplied to the capacitor 90 through a relatively low resistance 96 is maintained open.

As the capacitor 90 charges, the oscillator 76 begins to oscillate at a low frequency and pulses are supplied in turn to the lines $\phi1$–$\phi4$ so as to cause the motor armature to rotate slowly. At this time, the pulse width modulation circuit 84 is in a condition in which the full width of each pulse is allowed to pass. The voltage developed across the capacitor 90 is also compared to a threshold value in a comparator 98 and the output of the comparator 98 is applied to the start control logic 86. The latter circuit is connected to input 62 and, if the comparator 98 indicates that the threshold has been exceeded by the voltage across the capacitor 90 prior to the receipt by the start control logic 86 of a pulse on input 62, this indicates that the motor has failed to start. The start control logic 86 then aborts the start sequence by discharging capacitor 90 and again setting counter 78 to a condition in which line $\phi4$ is energized to bring the motor armature to the home position. The start sequence is then begun again.

If the start control logic circuit 86 receives a pulse on input 62 before the voltage across the capacitor 90 reaches the threshold established by comparator 98, this indicates that the motor has started satisfactorily. A switch 94 is then closed by the logic circuit 86, in order to increase the rate of charge of the capacitor 90 and accordingly the rate of increase of the frequency of the signal output by the voltage controlled oscillator 76. Thus, the motor is accelerated more rapidly. It is necessary that the rate of acceleration of the motor should be equal to the rate of increase in frequency in the signal output by the oscillator 76. The rate of acceleration of the motor cannot exceed the rate of increase in frequency of the signal produced by the oscillator 76 since the motor is being driven by pulses derived by this signal. However, due to the inertia of the motor and of the polygons, it is possible that the rate of increase in frequency of the oscillator 76 may begin to exceed the rate of acceleration of the motor. If the rate of increase of frequency and the rate of acceleration are equal, the fourth stage of the counter 78 always remains at zero because the counter is reset, before a "one" appears in the fourth stage, by the signal appearing on line 62 following each complete revolution of the motor i.e. the counter is reset following each eight cycles of the signal output by the oscillator 76. If, however, the rate of increase in frequency of the oscillator 76 exceeds the rate of increase in speed of the motor, a signal will be output by the fourth stage of counter 78 before the counter is reset. This signal is applied to an inverter 100 which draws some current from the capacitor 90 via diode 102 and resistor 104, to reduce slightly the voltage applied to the oscillator 76, thus slightly reducing its frequency. In this way, the rate of increase of frequency of the oscillator 76 is maintained equal to the acceleration of the motor. The polygons are accelerated with the motor under full power until the speed detector 56 detects that the frequency of the signal from pickup S7 has exceeded 22.4 KHz. A signal indicative of this is received by input 66 of the circuit 52 and applied to logic 106 which switches the pulse width modulation circuit 84 to a condition in which it may modulate the width of the pulse supplied by the decoder 82 in accordance with a voltage output by the phase detector 64 and supplied to the circuit 52 on input 68.

The timing of each pulse on each of lines $\phi1$–$\phi4$ is such that the centre of each pulse coincides substantially with the position of the rotor 50 at which maximum torque is produced. This is achieved by means of a comparator 108 and a triangular wave generator 110, the operation of which will be understood by reference to FIG. 5.

Figure 5:
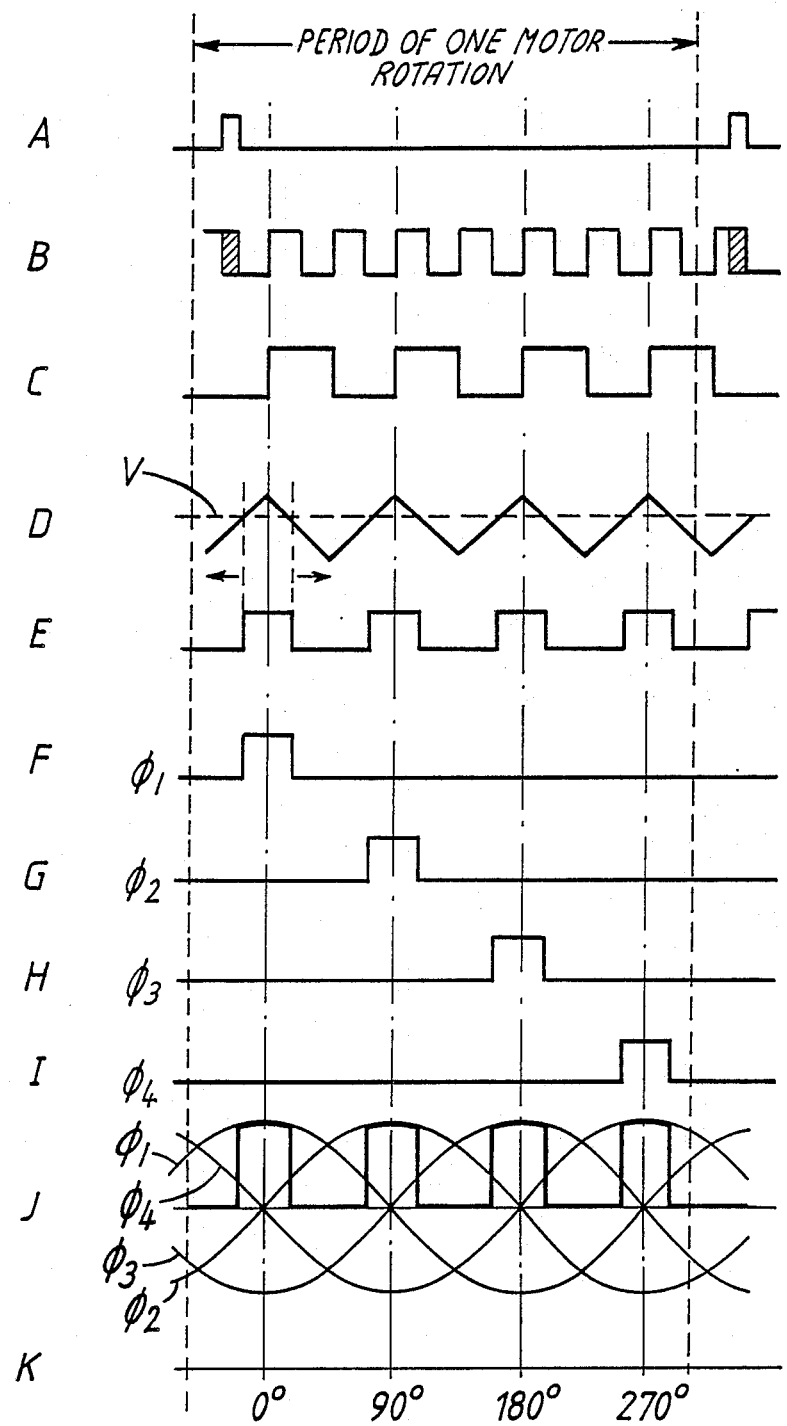
FIG. 5 is a timing diagram illustrating the operation of the circuit of FIG. 4.

Waveform A of FIG. 5 represents the pulses applied on line 62. These pulses, as already described, reset the counter 78, but also synchronize the output of the oscillator 76, illustrated at B in FIG. 5, to the trailing edge of the pulses of waveform A. The frequency of the output of the oscillator 76 is taken to be f. A square wave of frequency f/2 is output by the first stage of counter 78, as represented by waveform C in FIG. 5. This is applied to the input of triangular wave generator 110 which generates a triangular wave as indicated at D in FIG. 5, whose positive and negative peaks coincide respectively with the leading and trailing edge of the pulses of waveform C. As will be understood by those skilled in the art, the circuit 110 may operate by adjusting the waveform C so that it is symmetrical about zero and applying the resulting waveform to an integrator. Since the synchronizing of the oscillator 76 is effected by pulses generated by the movement of the insert 38 past the pickup F8 and since the position of the insert 36 relative to the rotor 50 is known, it is arranged that the positive peaks of the triangular waveform D coincide with the positions of the rotor at which maximum torque is achieved. The torque applied to the rotor by energization of each of lines $\phi1$–$\phi4$ is approximately as shown at J in FIG. 5. It can be seen that the pulse on line 1, shown at F in FIG. 5, is applied with a timing such that the center of the pulse occurs when the torque for energization of that line is at a maximum. Similarly, the center of the pulses on lines $\phi2$–$\phi4$, shown at G-I in FIG. 5, occur when the torque applied to the rotor by energization of the respective lines is at a maximum. The pattern of energization applied to the rotor by the pulses shown at F-I in FIG. 5 is shown by the heavy line at J in FIG. 5. If the rotor position shown in FIG. 3 is taken as 0°, then maximum torque is achieved by the pulses on lines $\phi1$–$\phi4$ when the rotor is approximately in positions 0°, 90°, 180° and 270° respectively, which positions are indicated at K in FIG. 5. In practice, the maximum torque positions vary slightly from these angles due to factors such as back e.m.f. in the motor coils. The inductance of the motor coils in practice results in finite rise and fall times for the drive current.

Comparator 108 receives, as a reference level, a voltage V (see waveform D of FIG. 5) from the phase comparator 64. The magnitude of V increases above or decreases below a predetermined value representing zero phase error according to whether the phase of the signal from averaging circuit 70 leads or lags that of the 22.4 KHz reference signal from the divider 60. The comparator 108 compares the triangular waveform D with the voltage V and outputs pulses, as indicated at E, whose width is equal to the width of the portions of the triangular waveform D above level V. Thus, when the phase of the signal from averaging circuit 70 leads, the width of pulses in waveform E reduces and when it lags the width increases. Pulses shown at F, G, H and I in FIG. 5, which are coincident with the pulses E in FIG. 5, are output by circuit 84 on lines $\phi1$–$\phi4$ respectively, in sequence. These pulses F, G, H and I are thus modulated in width in accordance with phase variations detected by circuit 64 so that the power applied to the motor 4 is varied, in accordance with these phase variations. However, the pulses are also centred at the positions of maximum torque of the rotor 50 but are modulated in width. Substantially centring the power pulses applied to the coils of the motor at the rotor positions corresponding to maximum torque provides a significant saving in power consumption.

Figure 6:
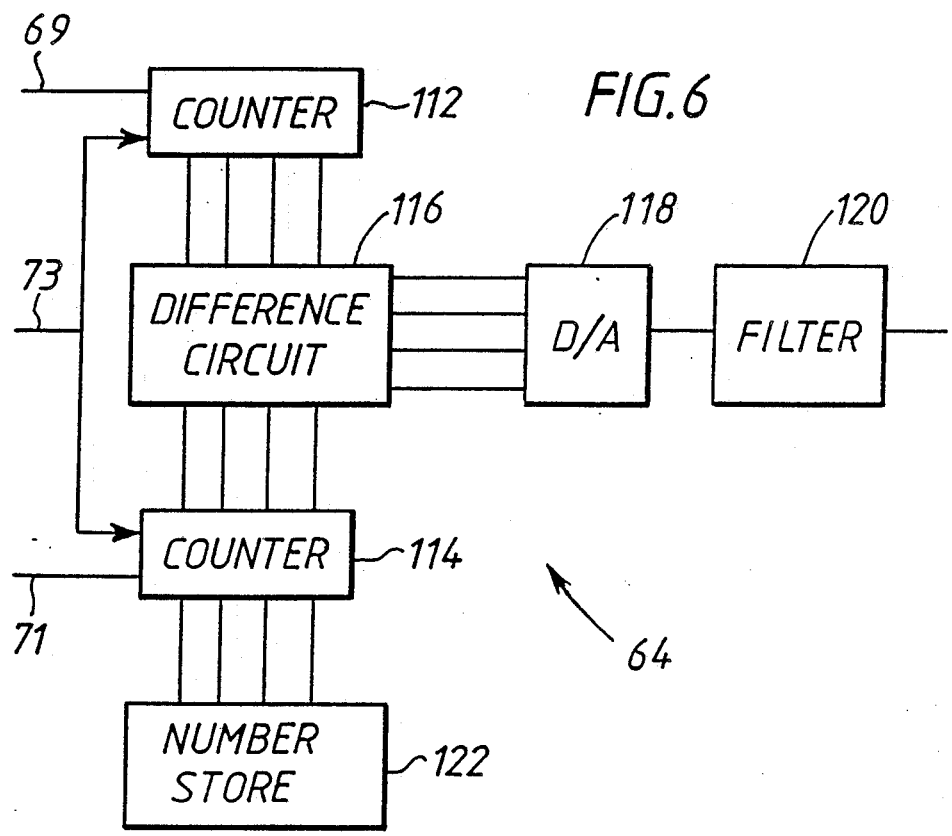
FIG. 6 is a block diagram showing a preferred form of phase comparison circuit included in the circuit of FIG. 3.

With reference to FIG. 6, the phase detector circuit 64 comprises a first digital counter 112 which receives and counts pulses on input 69 from the averaging circuit 70, a second digital counter 114 which receives and counts 22.4 KHz reference pulses on input 71, a differencing circuit 116 which calculates the difference between the counts in the counters 112 and 114, a digital-to-analogue converter 118 which converts the difference provided by circuit 116 to analogue form, and a filter 120 for smoothing the output from digital-to-analogue convertor 118. A number store 122 stores a number which is to represent zero phase difference between the signals applied on inputs 69 and 71.

Figure 7:
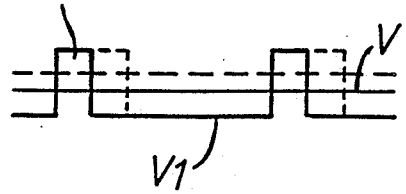
FIG. 7 is a waveform diagram illustrating the operation of the circuit of FIG. 6.

Referring additionally to FIG. 3, when the resetting circuit 72 receives the first frame pulse from AND gate 74 to be generated after the generation of a signal by circuit 56 indicating that the required speed has been reached, a resetting signal is generated on line 73. This resets the divider 60, sets the counter 112 to zero and loads the number in store 122 into counter 114. The counters 112 and 114 then proceed to count in accordance with pulses received on lines 69 and 71. Assuming the pulses received are in phase, the difference between the number in counter in 112 and that in 114 remains constant so that the voltage output by D/A converter 118 also remains constant. This condition remains so long as the polygons are rotating at precisely the required speed. If the speed increases slightly, the pulses on line 69 will begin to lead those on line 71. As a consequence and considering the arrival of a given pulse on line 69, the count in counter 112 will change before the count in counter 114. The difference output by circuit 116 will correspondingly change thus changing the level of the voltage output by circuit 118. As soon as the next pulse is received by counter 114, the difference output by circuit 116 will revert to its previous value. Thus, as shown in FIG. 7, the output of digital-to-analogue converter 118 will be at a value v1 during periods when the number of pulses counted by counters 112 and 114 is equal and at a value v2 at times when the number of pulses counted by counter 112 exceeds by unity the number counted by counter 114. The filter 120 smooths the output of converter 118 to produce the voltage v which is output by the phase detector. If the lead in phase of the signals applied to line 69 increases, the width of the pulses of value v2 increases so that the level of voltage V is raised as shown in broken lines in FIG. 7. If the pulses on line 69 lag in phase relative to the reference signal on line 71, then the value v2 will be less than the value v1 shown in FIG. 7 i.e. the waveform of FIG. 7 will be inverted.

If the phase difference between the signals on lines 69 and 71 becomes precisely one cycle, the signal output by convertor 118 will be continuously at level V2 and reference level V will equal V2. If the phase difference is greater than one cycle, then the convertor 118 and filter 120 will correspondingly provide an output which is partly at V2 and partly at a level higher than V2. Thus, the phase detector shown in FIG. 6 has the advantage that it can detect phase errors of greater than one or more cycles.

In practice, the differencing circuit 116 may be an adder, in which case the counter 114 may be a down counter and the counter 112 an up counter.

The logic circuit 106 is arranged so that if the phase difference exceeds predetermined limits, the pulse width modulation circuit 84 is disabled so that the speed of the motor is no longer controlled by the phase detector 64 but instead is controlled by the output of speed detector circuit 56 such that if the speed is too high, the power supplied to the motor is turned completely off i.e. no pulses are output by the pulse width modulation circuit 84 on lines φ1 φ4 whereas if the speed is too low, full width pulses are output by circuit 84 on to lines φ1-φ4. Control on this basis is also effected, upon completion of the start sequence, in the interval between (a) the generation of a signal by the circuit 56 indicating that the required speed has been reached (b) and the time when the phase detecting circuit 64 is put into operation in response to receipt of the next frame pulse from AND gate 74.

Although the digital portions of the phase detector of FIG. 6 are assumed to be implemented in hardware, which is preferred, it would alternatively be possible to implement them by programmed microprocessor. Such microprocessor may then output a digital signal representing the difference between the two counts and this signal would be converted to analogue form.

Figure 8:
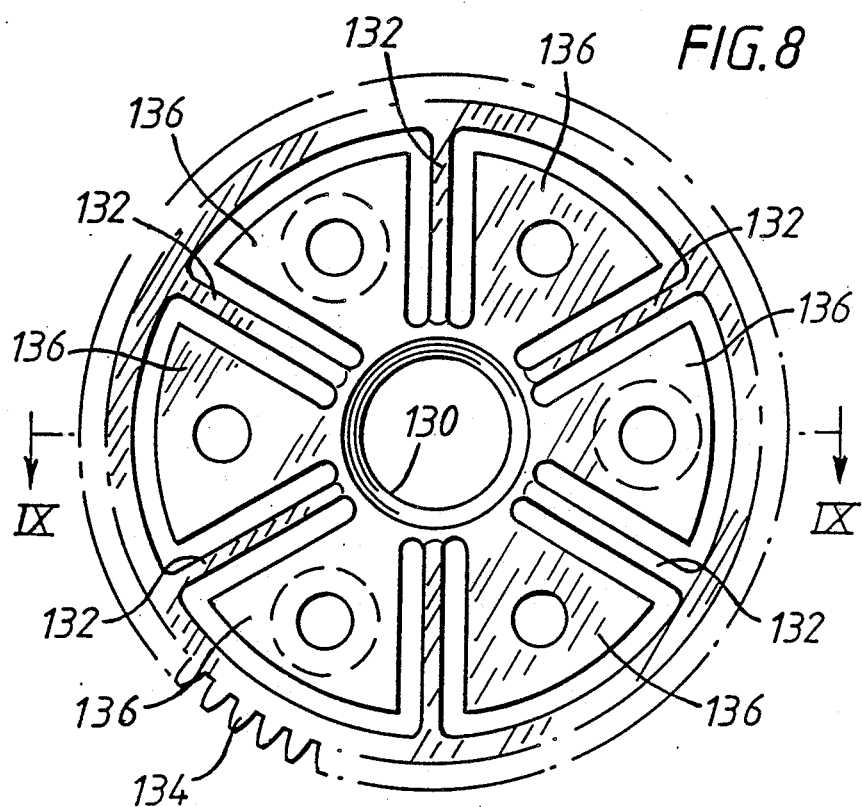
FIG. 8 illustrates a preferred form of resilient gear used in the apparatus shown in FIG. 2.
Figure 9:
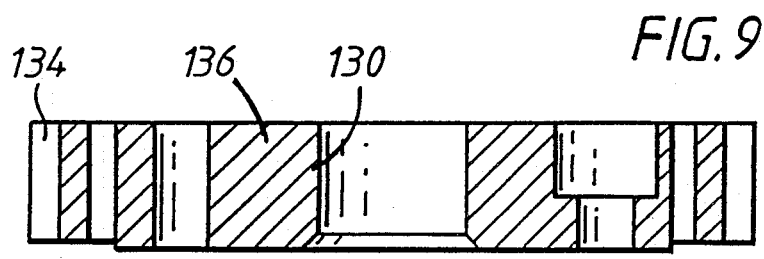
FIG. 9 is a section on the line IX IX of FIG. 8.

With reference to FIGS. 8 and 9, the resilient gears 24, 26, 30 and 31 each comprise a hub 130, spokes 132 and a toothed rim 134 joined to the hub 130 by the spokes 132. The entire gear is moulded out of resilient plastic material and the spokes 132 are resiliently flexible in the circumferential direction. The lands 136 attached to the hub 130 are located between the spokes 132 so as to limit the degree to which the spokes may be circumferentially flexed. Thus, the lands act as stops.

This construction provides for a limited degree of torsional flexibility in the gears 26 and 32. This resilient flexibility minimizes the impulse energy of tooth impacts and provides a greater degree of speed regularity. The provision of the lands 136 ensures that, during acceleration, the amount of distortion of the gears 26 and 32 is limited. The function of the lands is to substantially increase the rotational or torsional stiffness of the gear when they engage the spokes 132.

By way of summary, the servo disclosed represents a major step forward in the accurate and reliable control of a motor in a manner which utilises available power with maximum efficiency. The centering of the pulse width modulated drive pulses on substantially the point of maximum torque minimises power consumption. The start sequence in which the frequency of the applied pulses is initially increased at a low rate and then at a higher rate and in which the start sequence is restarted in the event that the motor fails to start provides exceptional reliability and the use of a controlled oscillator for generating the pulses contributes to this reliability and results in relatively low cost. The digital phase detector disclosed, which is capable of detecting phase differences of more than one cycle, provides accurate control. The generation of speed representing signals having a frequency substantially higher than that of the frequency of rotation of the motor provides exceptionally smooth and accurate operation. As will be appreciated from consideration of the drawings and description thereof, in the preferred embodiment the frequency of the speed representing signal generated by the pick-ups S7 and S8 is more than 100 times the frequency of rotation of the motor this being an important aspect of the invention.

I claim:

1. A variable drive apparatus, comprising:
   a stepper motor having a rotor and a plurality of coils;
   power supply means arranged to supply pulses to said coils in sequence to cause sustained rotation of said rotor;
   means for modulating the width of said pulses for varying the power applied to said coils;
   signal generating means for generating a variable rate signal;
   signal producing means for receiving said variable rate signal and producing a first signal, the timing of which controls the timing of the centers of said pulses, and a second signal, which controls progress through said sequence, the first and second signals having a predetermined timing relationship to each other and each having a timing and a frequency determined by said variable rate signal;
   means to supply a control signal having a timing in accordance with the phase position of said rotor; and
   means to enable the generation of the variable rate signal by said signal generating means to be effected by said control signal so as to maintain the centers of said pulses substantially coincident with the positions of the rotor relative to the coils at which maximum torque is generated.

2. Apparatus according to claim 1, wherein said modulating means comprises means for producing a triangular wave, means for producing a reference level intermediate the maximum and minimum values of the triangular wave, means for providing said pulses during periods when the value of the triangular wave is to one side of said reference value, and means for varying the relationship between the reference value and the triangular wave thereby to modulate the width of the pulses.

3. Drive apparatus comprising a stepper motor, power supply means for supplying drive pulses to said motor for effecting sustained drive of said motor, and start control means operable to perform a start sequence in which it causes the power supply means to supply said drive pulses initially at a low frequency and said frequency is increased at a relatively low rate for an initial period determined by the speed of rotation of the motor and subsequently at a relatively high rate.

4. Apparatus according to claim 3, wherein said power supply means supplies said drive pulses in accordance with control pulses and said start control means comprises a variable frequency pulse source operable to produce said control pulses, means to sense the speed of said motor, and means to limit the rate of increase of frequency of said control pulses dependent upon the rate of increase of the sensed speed of said motor.

5. Apparatus according to claim 4, wherein said control pulses have a higher frequency than said drive pulses and said means to limit comprises counter means operable to count the number of said control pulses in a period defined by the speed of the motor and to reduce the rate of increase of frequency of the control pulses if the number thereof within said period exceeds a predetermined number.

6. Apparatus according to claim 5, wherein said source of controlled pulses comprises a voltage control oscillator, a capacitor connected thereto for defining the frequency of the oscillator, means for increasing the voltage on the capacitor in order to increase the frequency of the control pulses, said means to limit being effective to partially discharge said capacitor.

7. Drive apparatus comprising a stepper motor, power supply means for supplying pulses to said motor for effecting sustained drive of said motor, start control means operable to control said power supply means to perform a start sequence for said motor, detector means to detect whether said motor has started, and timing means for providing a time out signal at the end of a time-out interval from the beginning of the start sequence, said control means being responsive to said detector means and said timing means to restart the start sequence and reset said timing means in the event the said timing means provides said time-out signal before said start control means receives a signal from the detector means indicating the the motor has started.

8. Drive apparatus comprising a motor, means for supplying a first signal at a reference frequency representing a speed at which said motor is to be driven, means for supplying a second signal having a frequency representing the actual speed of the motor, first and second counters arranged for receiving respectively said first and said second signals, means for obtaining a further signal representing the difference in the number of cycles of said first and second signals counted by said first and second counters respectively, and means for controlling the speed of the motor in dependence upon the value of said further signal.

9. Apparatus to claim 8, wherein said means for obtaining a further signal comprises means for obtaining a digital signal representing said difference, and a digital-to-analogue converter for converting said digital difference signal to analogue form.

10. Apparatus according to claim 9, wherein said analogue signal alternates between first and second values with a mark space ratio representative of any phase difference of a fraction of a cycle between said first and second signals.

11. Apparatus according to claim 10, including means for smoothing said analogue signal.

12. Apparatus according to claim 9, wherein one of said counters is arranged to count up and the other is arranged to count down and wherein said means for obtaining a digital signal representing said difference comprises an adder.

13. Apparatus according to claim 8, including reset means for zeroing one of said counters and setting a predetermined number into the other.

14. Drive apparatus comprising a motor, means for supplying a first signal at a reference frequency representing a desired frequency of revolution of said motor, means for providing a second signal having a frequency representing the actual frequency of revolution of said motor, said frequencies of both of said first and second signals being at least 100 times said frequency of revolution, first detector means for detecting the difference between said frequencies of said first and second signals, second detector means for detecting a phase difference between said first and second signals, third detector means for detecting whether the frequency difference is within predetermined limits, and control means responsive to the third detector means to control the speed of the motor in accordance with said frequency difference when said frequency difference is outside predetermined limits and in accordance with said phase difference when said frequency difference is within said predetermined limits.

15. Apparatus according to claim 1 wherein said modulating means modulates the width of said pulses by comparing a reference level with an alternating wave form, the frequency and timing of which are determined by the frequency and timing of said first signal.

16. Apparatus according to claim 1, wherein said control signal is input to said signal generating means, to control the phase of said variable rate signal.

17. Apparatus according to claim 1, wherein said signal producing means comprises a counter which receives said variable rate signal as a clock input and which provides said first and second signals as count outputs.

18. Apparatus according to claim 17, wherein the frequency of said variable rate signal is reduced if the count value of said counter exceeds a predetermined value before said control signal is received.

19. Apparatus according to claim 18, wherein said control signal resets said counter, and a rate reduction signal for reducing the frequency of the variable rate signal is provided if the count value of the counter exceeds said predetermined value.

* * * * *